Dec. 19, 1939.                D. BUCCICONE                2,184,035
                        STRIP WIDTH MEASURING DEVICE
                        Filed Dec. 30, 1937          2 Sheets-Sheet 1
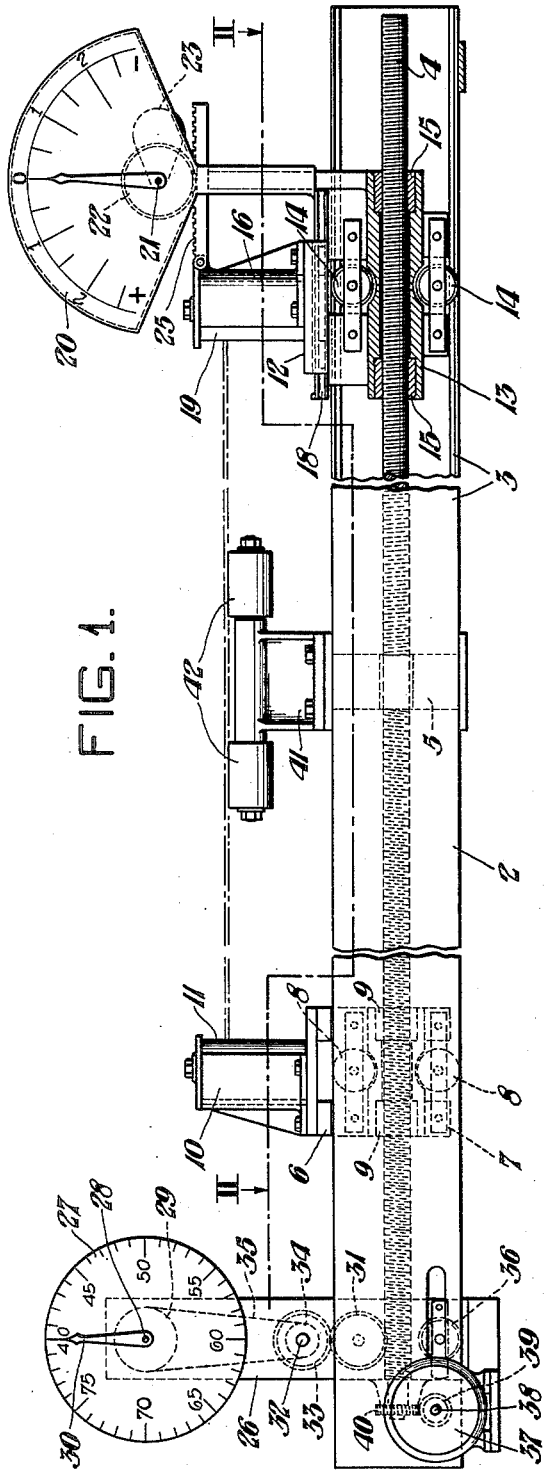
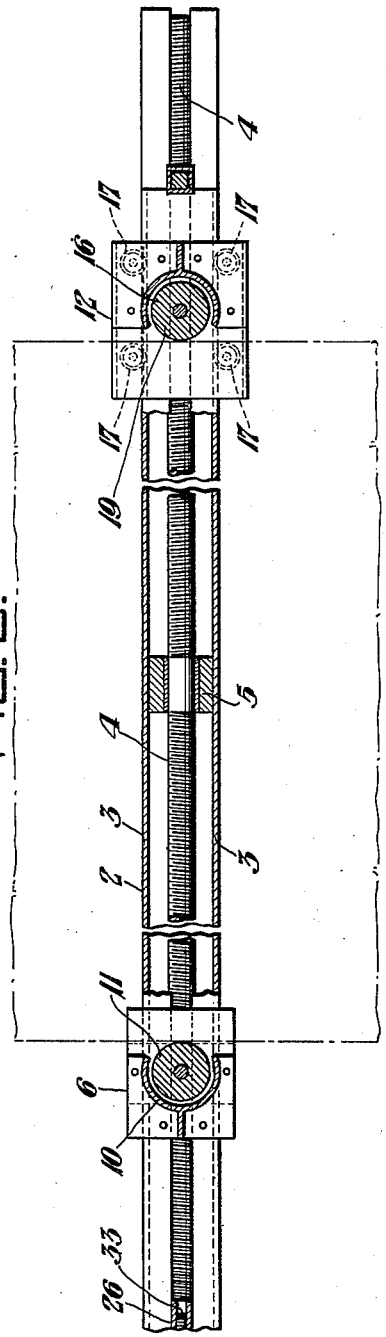
Inventor:
DARIO BUCCICONE,
by: *Usina & Lauber*
his Attorneys.

Dec. 19, 1939.  D. BUCCICONE  2,184,035
STRIP WIDTH MEASURING DEVICE
Filed Dec. 30, 1937  2 Sheets-Sheet 2
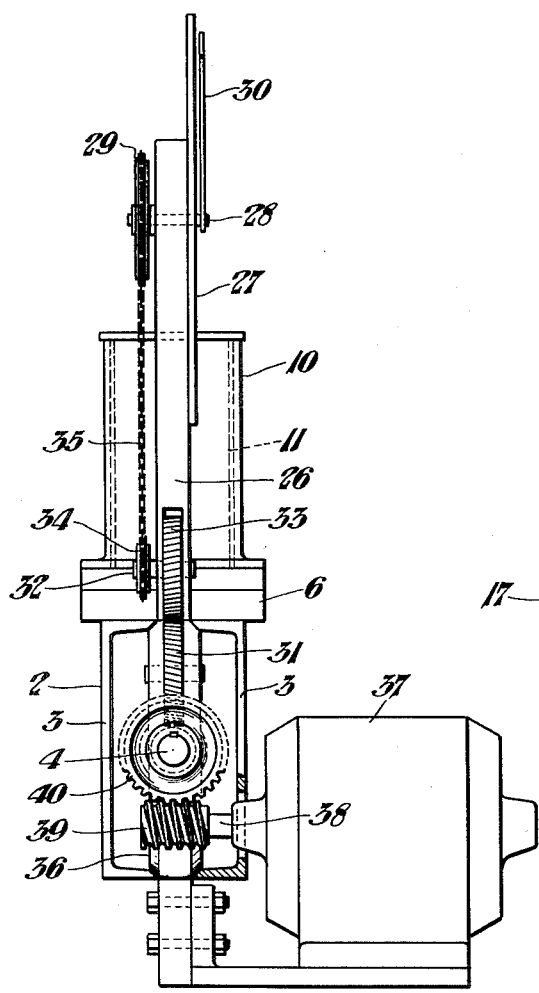
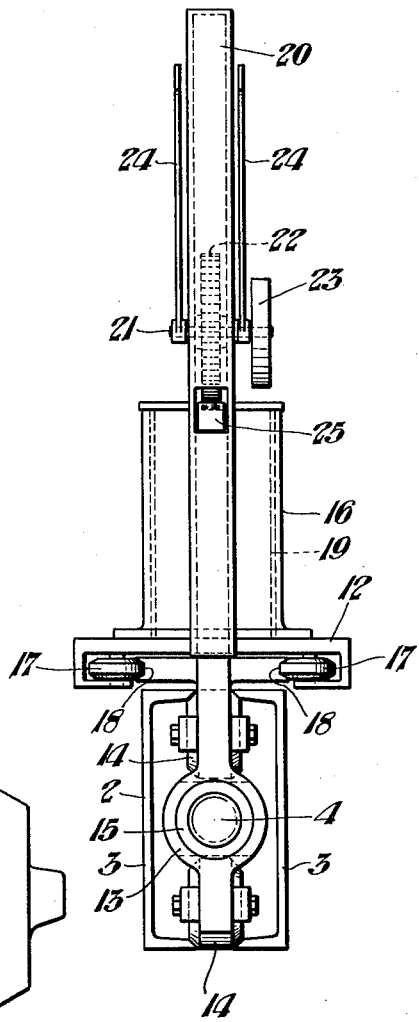
Inventor:
DARIO BUCCICONE,
by: Usina & Lauber
his Attorneys.

Patented Dec. 19, 1939

2,184,035

UNITED STATES PATENT OFFICE 2,184,035

STRIP WIDTH MEASURING DEVICE

Dario Buccicone, Gary, Ind.

Application December 30, 1937, Serial No. 182,624

6 Claims. (Cl. 33—147)

This invention relates to a measuring device and, more particularly, to an improved device for measuring the width of continuous strip material.

It is an object of this invention to provide an improved device which will automatically determine the variations in the width of a continuous strip of metal.

It is another object of this invention to provide an adjustable device for measuring continuous strip metal and the like having various widths.

It is a further object of the present invention to provide a device for measuring the width of continuous strip metal which will automatically adjust itself relative to the edges of the strip as the strip passes therethrough.

Various other objects and advantages of my invention will more fully appear in the course of the following specification, and will be particularly pointed out in the appended claims.

In the accompanying drawings, I have shown, for the purpose of illustration, one embodiment which my invention may assume in practice.

In the drawings:

Figure 1 is a front elevational view of the improved continuous strip measuring device of my invention;

Figure 2 is a sectional view taken on the line II—II of Figure 1;

Figure 3 is an end view of the device looking from the left side of Figure 1; and, Figure 4 is an end view looking from the opposite end thereof.

The improved measuring device of my invention, as shown in the drawings, comprises a rectangularly shaped box-like supporting structure or frame 2, preferably made by fastening two channel-like members 3 together in spaced relationship, with the channels opposite each other, so that the flanged portions of the same will provide an inner track or guideway therebetween; the purpose of which will be described later in the specification. A screw-shaft 4, having a right-hand threaded portion on one end thereof and a left-hand threaded portion on the opposite end, is centrally supported in the frame, preferably by means of a centrally located bearing member 5.

On one side of the center of the frame there is disposed a carriage 6 having a lower portion 7 extending between the channel-like members 3 and having guide-wheels 8 which are adapted to ride on the flanged portions of the members 3. The lower extending portion also carries a pair of threaded collars 9 which are adapted to cooperate with the respective threaded portion of the shaft 4. There is located on the top of the carriage a bracket 10 which carries a freely rotatable vertical roller 11 which is adapted to contact one side or edge of the strip.

There is disposed on the opposite side of the center of the frame 2 a similar carriage 12 having a lower portion 13 also extending between the members 3, and having guide-rollers 14 which are also adapted to ride on the flanged portions of the members 3. This lower extending portion also carries a pair of threaded collars 15 which are adapted to cooperate with the threaded portion of that end of the shaft 4. The upper portion of the carriage 12 has positioned thereon a movable bracket 16 having rollers 17 disposed therein which are adapted to cooperate with guide-grooves 18 in the upper part of this carriage. It also has a freely rotatable vertical roller 19 positioned thereon which is adapted to contact the other edge of the strip opposite the roller 11. There is also disposed on the carriage 12 a segmental calibrated dial 20 having centrally located therein a suitable shaft 21 having a gear 22 centrally positioned thereon and a counterweight 23 positioned on one end thereof in back of the dial, and a pair of hands or pointers 24 preferably positioned on the opposite end in front of both sides of the dial. The gear 22 is adapted to mesh with a gear-rack 25 carried by the upper portion of the movable bracket 16 on the carriage 12.

Preferably positioned adjacent one end of the frame 2 between the channel-like members 3 there is an upwardly extending bracket 26 having a calibrated dial 27 disposed at the top thereof. There is positioned centrally of the dial a stub-shaft 28 having a sprocket-wheel 29 arranged on one end thereof, preferably in the back of the dial, and a hand or pointer 30 on the opposite end thereof in the front of the dial. On the lower portion of the bracket 26 there is positioned a gear 31 which cooperates with that end of the threaded portion of the shaft 4. There is positioned on the bracket 26 immediately above the gear 31 a stub-shaft 32 having a gear 33 on one end thereof which is adapted to mesh with the gear 31 and a sprocket-wheel 34 on the opposite end thereof. There is provided between the sprocket-wheel 29 and the sprocket-wheel 34 a chain 35. The lower portion of the bracket 26 also carries guide-rollers 36 similar to the rollers 8 and 14.

There is also positioned adjacent this end of the frame 2, and preferably attached to the bracket 26, a reversible motor 37 having a shaft 38 and a worm 39 positioned thereon which is adapted to mesh with a gear 40 positioned on the end of the shaft 4.

There is positioned, preferably in the center of the frame 2, a bracket 41 on which there is suitaby arranged a pair of supporting rollers 42 which are adapted to hold up the center of the strip as it passes through the device.

In operation, the carriages 6 and 12, having contacting rollers 11 and 19, respectively, are moved the proper distance apart for the strip to be measured by means of the motor 37 which turns the screw-shaft 4 through the gears 39 and 40. As the screw-shaft 4 turns to move the carriages 6 and 12 it also drives the gear 31, which meshes with the gear 33 on the shaft 32 that carries the sprocket 24; the sprocket 24, in turn, drives the sprocket 29 on the stub-shaft 28 through the chain 35, which moves the pointer 30 to indicate on the dial 27 the distance apart of the carriages 6 and 12 at any position on the frame. This dial is so calibrated that the pointer will indicate thereon the corresponding distance between the adjacent sides of the opposed rollers 11 and 19.

As the strip passes continuously between the non-yieldable roller 11 and the roller 19 and in contact therewith, the variations in width will move the carriage 12 which, in turn, drives the shaft 21 through the gear-rack 25 moving the pointer 24, indicating on the segmental dial 20 the variations in width of the strip as it passes therealong. This dial 20 is calibrated to indicate, preferably in inches, the over and under variations in width of the strip.

It will be understood that the carriage is so arranged that the pointer 24 is normally at zero. The roller 19 is kept in contact with the edge of the strip, preferably by means of the counterweight 23, but any suitable spring arrangement may be provided.

If the edge of the continuous strip has a camber or uneven edge contacting the roller 11, it moves completely to either side of its regular path, moving the entire measuring device; that is, the carriages 6 and 12 and bracket 26, having guide-rollers 8, 14 and 36, respectively, will move in the channels of the frame, keeping the roller 11 always in contact with the edge of the strip, thus avoiding any error which would otherwise result if the device were stationary.

It will be apparent to those skilled in the art that the strip may enter the width measuring device of my invention without the need of a guiding mechanism and that the measurements of the width will be accurate even in the absence of such an auxiliary guiding means.

While I have, in this application, specifically shown and described an embodiment of my invention, it will be understood that this embodiment is merely for the purpose of illustration and description, and that various other forms may be devised within the scope of the invention, as defined in the appended claims.

I claim:

1. A device for determining the variations in width of continuous strip material comprising a rigidly mounted supporting member, a member movably arranged on each side of said supporting member for contacting the opposite edges of the strip, means associated with at least one of said contacting members for registering the variations in width of the strip, and adjustable means movably carried by said supporting member interconnecting said contacting members and for positioning the same a predetermined distance apart, said interconnecting means together with said contacting members movably mounted on said rigid supporting member so that the strip will adjust said contacting members relative to the edges thereof as it passes therebetween in contact therewith.

2. A device for measuring the width of a continuous strip of material comprising a rigid support, an adjusting screw movably mounted on said support, said screw having a left-hand threaded portion on one end thereof and a right-hand threaded portion on the opposite end, means movably arranged on said support and associated with each of said threaded portions for contacting the opposite edges of the strip, means associated with said screw for determining the distance apart of said contacting means, means for rotating said screw to move said contacting means associated therewith so as to position the same the proper distance apart for the strip to be measured with one of said contacting means movably arranged relative to said screw, and means actuated by said last mentioned movable contacting means for determining the width of the strip as it passes in contact therewith, said screw together with the contacting means carried thereby being floatingly arranged on said support so that the strip will adjust the position of the contacting means relative to the edges of the strip as it passes continuously therebetween in contact therewith.

3. A device for determining the variations in width of continuous strip material comprising a rigid member, oppositely disposed means arranged on said member for contacting the opposite edges of the strip, means movably carried by said rigid member interconnecting said contacting means for positioning the same a predetermined distance apart for the strip to be measured, and means associated with at least one of said contacting means for registering the variations in width of the strip, said adjustable contacting means together with the interconnecting means being freely movable as a unit relative to said rigid member so that the strip will adjust the contacting means relative to the edges of the strip as it passes continuously therebetween in contact therewith.

4. A device for determining the variations in width of continuous strip material comprising a rigid support, a screw movably mounted on said support, said screw having a left hand threaded portion on one end thereof and a right hand threaded portion on the opposite end, means movably arranged on said support and cooperating with each of said threaded portions for contacting the opposite edges of the strip, means for turning said screw so as to position said contacting means the proper distance apart for the strip to be measured, and means associated with at least one of said contacting means for registering the variations in width of said strip, said screw together with the contacting means associated therewith being freely movable as a unit relative to said rigid support so that the strip will adjust the contacting means relative to the edges of the strip as it passes continuously therebetween in contact therewith.

5. A device for determining the variations in width of continuous strip material comprising a rigid support, a pair of carriages movably mounted on said support, means movably carried by said support interconnecting said carriages for positioning them a predetermined fixed distance apart, means arranged on each of said carriages for contacting the opposite edges of said strip, and means associated with at least one of said carriages for registering the variations in width of the strip to be measured, said carriages together with said movable interconnecting means being freely movable as a unit relative to said rigid support so that the strip will adjust the carriages relative to the edges of said strip as it passes continuously therebetween in contact with the contacting means carried thereby.

6. A device for determining the variations in width of continuous strip material comprising a rigid support, a pair of carriages movably mounted on said support, a screw movably arranged on said support interconnecting said carriages, said screw having a left hand threaded portion on one end thereof which is adapted to cooperate with one of said carriages and a right hand threaded portion on the opposite end which is adapted to cooperate with the other carriages to position the carriages a predetermined fixed distance apart, means for turning said screw, means carried by each of said carriages for contacting the opposite edges of the strip to be measured, and means associated with at least one of said contacting means for registering the variations in width of said strip, said screw together with the carriages and the contacting means arranged therewith being freely movable as a unit relative to said rigid support so that the strip will adjust the carriages relative to the edges of the strip as it passes continuously therebetween and in contact with the contacting means carried thereby.

DARIO BUCCICONE.